April 29, 1924.
E. C. SASNETT
1,492,182
AUTOMATIC VEHICLE CONTROLLING SYSTEM
Filed April 4, 1923
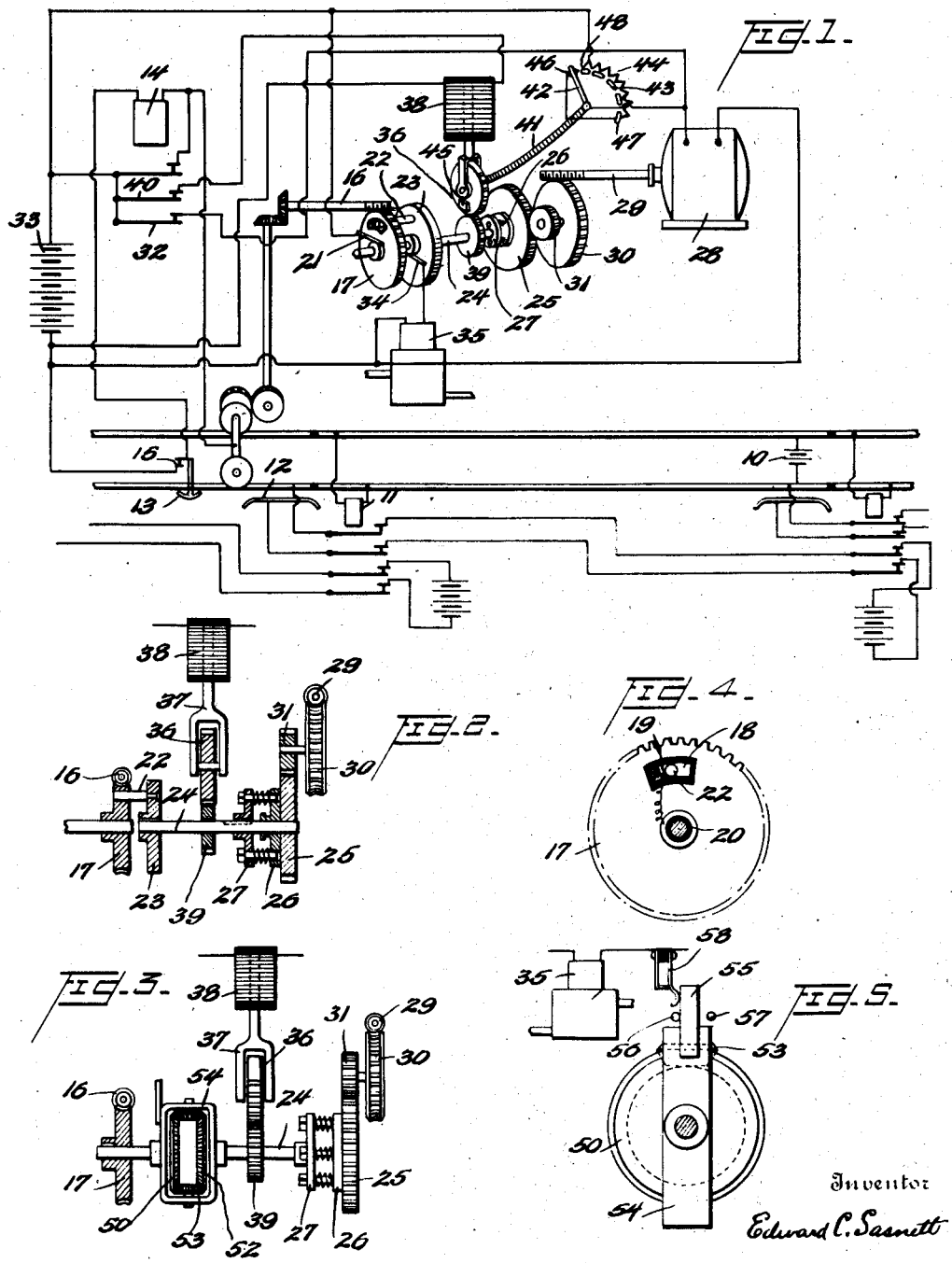
Inventor
Edward C. Sasnett Patented Apr. 29, 1924.

1,492,182

UNITED STATES PATENT OFFICE.

EDWARD C. SASNETT, OF WASHINGTON, DISTRICT OF COLUMBIA.

AUTOMATIC VEHICLE CONTROLLING SYSTEM.

Application filed April 4, 1923. Serial No. 629,787.

*To all whom it may concern:*

Be it known that I, EDWARD C. SASNETT, a citizen of the United States, and a resident of Washington, in the District of Columbia, have invented certain new and useful Improvements in Automatic Vehicle Controlling Systems, of which the following is a specification.

My invention relates to automatic vehicle controlling systems and more particularly to systems for controlling railway vehicles in accordance with traffic conditions. It has for its general object to provide a system by means of which a railway vehicle may be automatically controlled under caution and danger conditions. A specific object of the invention is to produce a system by means of which the speed of a vehicle must necessarily be reduced under caution conditions in accordance with a predetermined speed curve whose ordinates and abscissæ are functions, respectively, of the speed of the vehicle and the distance travelled under said conditions. Systems producing this result are well known to those versed in the railway signalling art. The known systems comprise a vehicle equipment having a member, or medium, which is adapted to change gradually in proportion to the travel of the vehicle or to the lapse of time and a speed-responsive device, such as a centrifugal governor, which coacts with said member or medium in such a way as to impose under caution conditions a gradually decreasing speed limit. The system of the present invention, while accomplishing this general result, has a novel mode of operation and possesses certain important advantages over the known systems.

In the system of the present invention, the permissive speed of the vehicle is established by means of a medium which changes in condition or position at a predetermined rate, the rate of change determining the permissive speed. Cooperating with the medium which establishes the permissive speed is a second medium which changes at a rate proportional to the travel of the vehicle, and this medium coacts with the first medium in such a way that whenever the rate of change of the second medium exceeds that of the first medium vehicle controlling mechanism will be brought into operation, either to retard the vehicle or to give a caution indication or both. The invention thus provides a variable speed limit device in which the permissive speed is established by the rate of change of a suitable medium, which rate is adapted to be selected in accordance with any given conditions.

Having stated in a general way the nature and object of my invention I will now describe specifically a system embodying the invention by reference to the accompanying drawings, whereof:—

Fig. 1 is a diagrammatic view illustrating a railroad and a vehicle travelling thereon having an equipment embodying the present invention.

Fig. 2 is a longitudinal sectional view through certain controlling mechanism carried by the vehicle.

Fig. 3 is a similar view illustrating a modification.

Figs. 4 and 5 are detail views illustrating certain parts of the vehicle carried mechanism.

Referring to Fig. 1, there is illustrated a portion of a railway track divided by insulated joints, separated a suitable distance, into block sections, the rails of each section forming a portion of a closed track circuit which includes a battery 10 connected to the rails at the exit end of the block and a relay 11 connected to the rails at the entrance end. A ramp rail 12 is located adjacent to the entrance of each block and is connected to the track rail through a battery and through front contacts of the track relays connected to the two blocks immediately in advance. It will be understood, therefore, that when a vehicle occupies either of the two blocks immediately in advance of a ramp rail the latter will be disconnected from its battery, while, on the other hand, if the two blocks immediately in advance of a ramp rail are clear, the ramp will be energized.

The vehicle equipment includes a shoe 13 adapted to contact the ramp rails and a relay 14 which has a stick circuit which includes a switch 15 operated by shoe 13. When shoe 13 passes onto a ramp rail, switch 15 is opened, thus breaking the stick circuit of relay 14, and if the ramp rail is at this time disconnected from its wayside battery by reason of another vehicle being in one of the two blocks immediately in advance, or from other cause, relay 14 will be deenergized and drop its armature, and cannot again pick up until an energized ramp is engaged by shoe 13. If, on the other hand, the two blocks immediately in advance are clear, the ramp will be connected to its wayside battery and current will flow therefrom through relay 14, holding it up until the stick circuit thereof has been reformed by the passing of the shoe from ramp 12 and the closing of switch 15.

The system thus far described is familiar to those versed in this art. It forms no part of the present invention and is illustrated merely to show one way of controlling the devices embodying the invention, which will now be described. Permanently geared to a non-driven wheel of the vehicle in any suitable way is a worm shaft 16 which drives a worm wheel 17 journaled in any suitable manner on the vehicle. The worm shaft 16 and worm wheel 17 are permanently in engagement so that the worm wheel will rotate at all times while the vehicle is in motion in exact proportion to the rate of travel of the vehicle. Referring more particularly to Fig. 4, which shows a side view of worm wheel 17, it will be observed that the worm wheel is provided with an insulated slot 18 which has yieldingly mounted near one end thereof a contact 19, which is connected to an insulated ring 20 on the shaft of worm wheel 17. A brush 21 in the brake controlling circuit contacts ring 20. Extending into the slot 18 is a pin 22 which is fixed to a disk 23, which, in turn, is fixed to a shaft 24. Rotatable on shaft 24 is a spur gear 25 which is frictionally engaged by a disk 26. Disk 26 is yieldingly pressed against gear 25 by a number of coil springs which surround pins fixed to a disk 27 and passing through holes in disk 26. Disk 27 is keyed to shaft 24. Gear 25 is driven through a suitable reducing gearing from an electric motor 28, the reducing gearing shown consisting of a worm 29 driven by the armature of the motor, a worm wheel 30, and a small spur gear 31 meshing with gear 25. The motor circuit is normally closed through a front contact 32 of relay 14, the circuit including a battery 33. The motor, therefore, is normally operating and at maximum speed. The brake controlling circuit includes battery 33, brush 21, ring 20, contact 19, pin 22, a brush 34 electrically connected to pin 22, and any suitable electrically controlled brake governing mechanism 35. Normally, therefore, this brake controlling circuit will be closed as long as the worm wheel 17 does not rotate faster than disk 23. Since normally the motor 28 rotates at maximum speed, the disk 23 will rotate at maximum speed and consequently the worm wheel 17 is permitted to rotate at a maximum speed without over-running disk 23 and causing separation of pin 22 from contact 19, which would cause an application of the brakes. This mechanism, therefore, normally imposes a maximum speed limit which the vehicle may not exceed without application of the brakes.

When the vehicle approaches a hazard, or under caution conditions, it is desired to impose a gradually decreasing speed limit, so that the vehicle will necessarily be brought to a minimum safe speed before the hazard is reached. In the specific embodiment of the invention illustrated, this is accomplished by the following mechanism: A mutilated gear wheel 36 is journaled in a yoke 37 connected to the plunger of a solenoid 38. When the solenoid is deenergized the gear 36 is adapted to drop into engagement with a gear 39 fixed on shaft 24. The solenoid is normally energized by a circuit including battery 33 and a front contact 40 of relay 14, so that the gear 36 is normally held up out of engagement with gear 39. Gear 36 operates a flexible shaft 41 which is connected to rotate an arm 42 over a circular series of contacts 43 which are connected to different points of a resistance 44. Gear 36 is biased by a weight 45, or other suitable means, to assume the normal position shown in Fig. 1. In this position the arm 42 makes contact with a terminal contact 46 which is connected to the other terminal contact 47 of the rheostat.

The operation of the mechanism thus far described may be briefly set forth as follows: As already stated, under normal clear conditions, the motor 28 is operating at maximum speed, as the rheostat 44 under these conditions is shunted by front contact 32. Now when the vehicle approaches the entrance to a block, the block in advance of which is occupied, relay 14 will drop its contacts, opening the normal circuit of the motor and opening the circuit of solenoid 38. The opening of the normal motor circuit inserts the rheostat 43 into said circuit, and as the arm 42 is now engaging contact 46, the motor circuit will include the maximum resistance of the rheostat. Hence the speed of the motor will immediately decrease to a minimum. If at this time the vehicle is travelling at a high speed, the worm wheel 17 will over-run disk 23 and tend to cause separation of the pin 22 from contact 19, but before the brake controlling circuit is broken by separation of these contacts, the speed of the motor is again brought up to maximum by the arm 42 moving from contact 46 on to contact 48, thus cutting out the resistance in the motor circuit. It will be observed that the gear 36 is brought into engagement with gear 39 simultaneously with the breaking of the normal motor circuit, and as it requires only a slight movement of gear 36 to cause arm 42 to move from contact 46 to contact 48, it will be understood that the slowing up of motor 28 will be only momentary and not of sufficient duration to cause an application of the brakes, even if the vehicle is travelling at maximum speed. If, however, under these conditions there should be anything wrong with the mechanism preventing the operation of gear 36, arm 42 would not move from contact 46 and the vehicle would quickly have imposed upon it a minimum speed limit. This device, therefore insures the initial operation of gear 36. The continued movement of the vehicle after receiving a caution indication will cause the arm 42 to move over the contacts of rheostat and gradually increase the resistance in the motor circuit, hence causing the disk 23 to be driven at a gradually decreasing speed. Since the wheel 17, which is driven by the vehicle, cannot over-run the disk 23 without causing separation of contact 19 from pin 22 and consequent application of the brakes, it follows that the vehicle will have imposed upon it a gradually decreasing speed limit. When arm 42 reaches the terminal contact 47 the mutilated part of gear 36 will have reached the gear 39 and hence gear 36 will no longer be driven. The vehicle may then proceed at the minimum speed.

Under certain conditions it may happen that the slowing down of motor 28 consequent to the opening of its high speed circuit by the dropping of relay 14 will cause the brake controlling circuit to be opened prior to the speeding up of the motor by the movement of arm 42 on to contact 48. This might occur if at the time relay 14 is deenergized the vehicle is travelling at such a speed that the contact 19 is just on the point of leaving pin 22. Under such conditions, any slowing up of disk 23 whatever would cause the pin to leave the contact and open the brake controlling circuit. To take care of this critical condition, therefore, I prefer to make the brake controlling mechanism 35 sufficiently slow acting to insure that it will not apply the brakes before the brake controlling circuit has been reformed by the speeding up of the motor consequent to the engagement of arm 42 with contact 48, although the same result might be accomplished in other ways just as well, as, for instance, by causing the contact 32 to be opened an instant after contact 40.

Figs. 3 and 5 illustrate a slight modification of the controlling mechanism. The construction shown by these figures is the same as that described above except that a differential mechanism is substituted for the pin and slot construction. In the modification the shaft to which worm wheel 17 is fixed drives one of the large gears 50 of a differential, the other large gear of said differential being keyed to shaft 24. The planetary gears 53 of the differential are journaled in a frame 54 which is rotatable on shaft 24 and the shaft of worm wheel 17. Frame 54 carries an arm 55 which is adapted to contact relatively fixed stops 56 and 57, whereby the movement of frame 54 in either direction is limited. Arm 55 is adapted to operate a switch 58 which is in the brake controlling circuit. In this modification the gears 50 and 52 are rotated in opposite directions by the vehicle and motor respectively. When these gears rotate with the same angular velocity the frame 54 remains stationary. If the vehicle driven gear 50 should rotate faster than the motor driven gear 52, the frame 54 will move in a clock-wise direction, looking at Fig. 5, thus causing the switch 58 to open. The movement of frame 54 in a clockwise direction is limited by stop 57 to a small amount, so that when the vehicle slows down, so as to cause gear 50 to rotate slightly slower than gear 52, frame 54 will move in a counter-clockwise direction immediately reforming the brake controlling circuit. It will be understood that when the frame is stopped by either stop 56 or stop 57, the gear 50 may continue to rotate and the motor 28 may continue to operate by reason of the frictional connection between gear 25 and shaft 24.

The system described has several advantages over the known systems for producing the same general result. In the first place the present system is extremely flexible with regard to the speed limits which it is adapted to impose, in that the speed limit may be changed by simply changing the speed of the motor; and where an electric motor is employed, this may be done very simply by changing the impedance in the motor circuit. In the second place, the present system employs a permanently engaged gearing between the wheels of the vehicle and the device responsive to the vehicle travel, making it possible to employ an extremely strong gearing permanently connecting these parts. In the systems heretofore known, the member responsive to the vehicle travel is of necessity normally held out of action and is adapted to be thrown into connection with the vehicle wheels by a clutch, movable gear wheel, or the like. If the clutch mechanism should fail, the system would fail and the failure would be on the side of danger. In the system of the present invention, on the other hand, there are no movable parts which must be operated in order to bring the vehicle responsive device into action; the vehicle responsive device is permanently geared to the vehicle wheels by a gearing which may be made practically indestructible. The present invention in the form illustrated does employ a device which must be thrown into operation in order to bring the speed limit down from a maximum to a predetermined minimum under caution conditions, but by constructing this device so that it will have a normal biased position in which it imposes a minimum speed limit and by requiring said device to be operated away from this position as a condition precedent to the establishment of a high speed limit, assurance is given that the device will be set in operation before the vehicle can proceed above a low safe speed. In the prior systems a centrifugal device is employed to control the vehicle in conjunction with a device responsive to the vehicle travel. This centrifugal device has a normal biased position when the vehicle is at rest, in which position it will permit the vehicle to proceed. In other words, if the centrifugal device should fail, the vehicle could proceed at any speed. In the system of the present invention, on the other hand, the device which cooperates with the vehicle driven element to control the vehicle is a time driven device, and failure of this device will cause an immediate application of the brakes.

I do not intend to limit my invention to the embodiments thereof described above, as the principle of the invention can be employed in widely differing mechanisms and it would be an easy matter to devise several such mechanisms substantially different from the mechanisms described above.

I claim:

1. Railway vehicle controlling mechanism, comprising a medium controlled by the vehicle and changing gradually in proportion to the travel thereof, a time controlled medium changing gradually in accordance with the lapse of time, means governed by traffic conditions and controlled by the vehicle for gradually varying the rate of change of said time controlled medium from a maximum to a minimum during the travel of the vehicle through a predetermined distance, and means for giving an indication when said train controlled medium changes at a greater rate than said time controlled medium.

2. Railway vehicle controlling mechanism, comprising a medium controlled by the vehicle and changing gradually in proportion to the travel thereof, a time controlled medium changing gradually in accordance with the lapse of time, means preventing said time controlled medium from changing at a greater rate than said train controlled medium, means governed by traffic conditions and controlled by the vehicle for gradually varying the rate of change of said time controlled medium from a maximum to a minimum during the travel of the vehicle through a predetermined distance, and means for giving an indication when said train controlled medium changes at a greater rate than said time controlled medium.

3. Railway vehicle controlling mechanism comprising a medium controlled by the vehicle and changing gradually in proportion to the travel thereof, a second medium changing in accordance with the lapse of time, a third medium governed by the difference between the rates of change of said first and second mediums, means governed by traffic conditions and controlled by the vehicle for gradually varying the rate of change of said second medium from a maximum during the travel of the vehicle through a predetermined distance, and vehicle controlling mechanism governed by said third medium.

4. Railway vehicle controlling mechanism, comprising a medium changing proportionately to the travel of the vehicle, a time controlled medium changing gradually in accordance with the lapse of time, means preventing said time controlled medium from changing at a greater rate than said vehicle controlled medium, means for varying the rate of change of said time controlled medium, and vehicle governing means actuated when said train controlled medium changes at a greater rate than said time controlled medium.

5. Railway vehicle controlling mechanism, comprising a medium changing proportionately to the travel of the vehicle, a time controlled medium changing gradually in accordance with the lapse of time, means preventing said time controlled medium from changing at a greater rate than said vehicle controlled medium, means governed by traffic conditions and controlled by the vehicle for gradually varying the rate of change of said time controlled medium from a maximum to a minimum during the travel of the vehicle through a predetermined distance, and vehicle retarding mechanism actuated when said vehicle controlled medium changes at a greater rate than said time controlled medium.

6. Automatic vehicle controlling mechanism, comprising a member geared to a wheel of the vehicle, a motor on the vehicle operating independently thereof, a member driven by said motor, means for varying the speed of the motor, and vehicle controlling mechanism governed by said members and actuated to retard the vehicle when the rate of movement of the first named member exceeds that of the second named member.

7. Automatic vehicle controlling mechanism, comprising a member permanently geared to a wheel of the vehicle, a motor on the vehicle operating independently thereof, a member driven by said motor, means governed by traffic conditions and actuated by the vehicle for varying the speed of said motor, and means for giving an indication when the rate of movement of the first named member exceeds that of the second named member.

8. Railway vehicle controlling mechanism, comprising a member driven in proportion to the travel of the vehicle, a member driven independently of the vehicle, a connection between said members adapted to prevent the second named member from moving faster than the first named member, means governed by traffic conditions and controlled by the vehicle for gradually changing the rate of movement of the second named member from a maximum to a minimum during the travel of the vehicle through a predetermined distance, and means governed by said members and actuated to retard the vehicle when the rate of movement of the first named member exceeds that of the second named member.

9. Railway vehicle controlling mechanism, comprising a member permanently geared to wheel of the vehicle, a motor operating independently of the vehicle, a second member, a driving connection between said motor and second member permitting independent movements of the latter, a connection between said members adapted to prevent the second member from moving faster than the first member, train retarding means actuated when the first member moves faster than the second member, means controlled by traffic conditions for operating said motor at a maximum speed under normal or clear conditions, said means being actuated when the vehicle approaches a predetermined hazard to decrease the speed of said motor.

10. Railway vehicle controlling mechanism, comprising a member permanently geared to a wheel of the vehicle, a motor operating independently of the vehicle, a second member, a driving connection between said motor and second member permitting independent movements of the latter, a connection between said members adapted to prevent the second member from moving faster than the first member, vehicle retarding means actuated when the first member moves faster than the second member, means controlled by traffic conditions for normally operating said motor at a maximum speed, a device for varying the speed of the motor from the maximum to a predetermined minimum, said device being normally held out of action and having a biased position in which it is adapted to cause the motor to operate at a minimum speed, means controlled by the travel of the vehicle for operating said device when released, said device after an initial operation establishing the maximum speed of the motor and thereafter decreasing the speed in accordance with the travel of the vehicle.

11. Railway vehicle controlling mechanism, comprising a member permanently geared to a wheel of the vehicle, an electric motor operating independently of the vehicle, a second member having a driving connection with said motor permitting restraint of said second member without varying the speed of said motor, means preventing the speed of said second member from exceeding that of said first member, vehicle retarding means actuated when the first member moves faster than the second member, means controlled by traffic conditions for normally connecting said motor with a source of energy through a minimum impedance, a device for varying the impedance of the motor circuit from a maximum to a predetermined minimum, said device being normally held out of action and having a biased position in which it is adapted to insert a maximum impedance in the motor circuit, and means controlled by the travel of the vehicle for operating said device when released, said device after an initial operation cutting out said maximum impedance and thereafter increasing the impedance in accordance with the travel of the vehicle.

12. Railway vehicle controlling mechanism, comprising a member driven proportionately to the travel of the vehicle, an electric motor operating independently of the vehicle, a second member having a driving connection with said motor permitting it to be restrained independently thereof, means for restraining said second member when the speed thereof exceeds that of the first member, vehicle retarding means actuated when the first member moves faster than the second member, a device controlled by traffic conditions for varying the impedance of the motor circuit from a minimum to a predetermined maximum, said device being normally held out of action and having a biased position in which it is adapted to insert a maximum impedance in the motor circuit, and means moving in accordance with the travel of the vehicle for operating said device when released, said device after an initial operation cutting out said maximum impedance and thereafter increasing the impedance in accordance with the travel of the vehicle.

13. Railway vehicle controlling mechanism, comprising a member driven proportionately to the travel of the vehicle, an electric motor operating independently of the vehicle, a second member having a driving connection with said motor permitting it to be restrained independently thereof, means for restraining said second member when the speed thereof exceeds that of the first member, vehicle retarding means actuated when the first member moves faster than the second member, a device controlled by traffic conditions for varying the impedance of the motor circuit, and means for operating said device when released in accordance with the travel of the vehicle.

14. Railway vehicle controlling mechanism, comprising a member driven proportionately to the travel of the vehicle, an electric motor operating independently of the vehicle, a second member having a driving connection with said motor permitting it to be restrained independently thereof, means for restraining said second member when the speed thereof exceeds that of the first member, means for giving an indication when the first member moves faster than the second member, a device controlled by traffic conditions for varying the speed of the motor from a maximum to a predetermined minimum, said device being normally held from operation, and means for operating said device when released in accordance with the travel of the vehicle.

15. Automatic vehicle controlling mechanism, comprising a member driven proportionately to the travel of the vehicle, an electric motor operating independently of the vehicle, a second member having a driving connection with said motor permitting it to be restrained independently thereof, means for restraining said second member when the speed thereof exceeds that of the first member, means for giving an indication when the first member moves faster than the second member, and means for varying the speed of the motor.

16. Railway vehicle controlling mechanism, comprising a member driven proportionately to the travel of the vehicle, an electric motor operating independently of the vehicle, a second member having a driving connection with said motor permitting it to be restrained independently thereof, means for restraining said second member when the speed thereof exceeds that of the first member, vehicle retarding means actuated when the first member moves faster than the second member, means controlled by traffic conditions for normally operating said motor at a maximum speed, a device for varying the speed of said motor, said device being normally held out of action and having a biased position in which it is adapted to impose a predetermined low speed on said motor, and means controlled by the travel of the vehicle for operating said device when released, said device after an initial operation increasing the motor speed and thereafter decreasing said speed in accordance with the travel of the vehicle.

17. Railway vehicle controlling mechanism, comprising a member driven proportionately to the travel of the vehicle, a motor operating independently of the vehicle, a second member having a driving connection with said motor permitting it to be restrained independently thereof, means for restraining said second member when the speed thereof exceeds that of the first member, vehicle retarding means actuated when the first member moves faster than the second member, a device for varying the speed of said motor, said device being normally held out of action and having a biased position in which it is adapted to impose a predetermined low speed on said motor, and means controlled by the travel of the vehicle for operating said device when released, said device after an initial operation increasing the motor speed and thereafter decreasing said speed in accordance with the travel of the vehicle.

18. Railway vehicle controlling mechanism, comprising a member driven proportionately to the travel of the vehicle, a second member driven independently of the vehicle in accordance with the lapse of time, means preventing the second member from over-running the first member, vehicle retarding means actuated when the first member over-runs the second member, a device for varying the speed of the second member, said device being normally held out of action and having a biased position in which it imposes a predetermined low speed on said second member, and means controlled by the travel of the vehicle for operating said device when released, said device after an initial operation increasing the speed of the second member and thereafter decreasing said speed in proportion to the travel of the vehicle.

19. Railway vehicle controlling mechanism, comprising a member driven proportionately to the travel of the vehicle, a second member driven independently of the vehicle in accordance with the lapse of time, means preventing the second member from over-running the first member, vehicle retarding means actuated when the first member over-runs the second member, a device controlled by traffic conditions for varying the speed of the second member, said device being normally held out of action, and means controlled by the travel of the vehicle for driving said device when released.

20. Railway vehicle controlling mechanism, comprising a member driven proportionately to the travel of the vehicle, a second member having a lost motion connection with said first member, time controlled means for driving said second member, means governed by traffic conditions for varying the speed of said time controlled means, and vehicle governing mechanism controlled by the relative movements of said members.

21. Railway vehicle controlling mechanism comprising a medium controlled by the vehicle and changing in proportion to the travel thereof, a time controlled medium changing in accordance with the lapse of time, means governed by traffic conditions for varying the rate of change of said time controlled medium, and means for giving an indication when said vehicle controlled medium changes at a greater rate than said time controlled medium.

22. Automatic vehicle controlling mechanism, comprising a member permanently geared to a wheel of the vehicle, a motor on the vehicle operating independently thereof, a member driven by said motor, means governed by traffic conditions for varying the speed of said motor, and means for giving an indication when the rate of movement of said first named member exceeds that of the second named member.

23. Automatic vehicle controlling mechanism comprising a member driven proportionately to the travel of the vehicle, an electric motor on the vehicle, a second member having a driving connection with said motor permitting it to be restrained independently of the speed thereof, means for restraining said second member when the speed thereof exceeds that of the first member, means for giving an indication when the first member moves faster than the second member, and means for automatically varying the speed of the motor in accordance with traffic conditions.

24. Automatic vehicle controlling mechanism comprising a member driven proportionately to the travel of the vehicle, an electric motor on the vehicle, a second member driven by said motor, means for giving an indication when the first member moves faster than the second member, and means for automatically varying the speed of the motor in accordance with traffic conditions.

25. Automatic vehicle controlling mechanism comprising a member driven proportionately to the travel of the vehicle, an electric motor on the vehicle, a second member driven by said motor, means for giving an indication when the first member moves faster than the second member, and means for varying the speed of the motor.

EDWARD C. SASNETT.